No. 773,904. Patented November 1, 1904.

UNITED STATES PATENT OFFICE.

HEINRICH LOUIS BENNO TOOBE, OF HORNSEA, ENGLAND.

METHOD OF PREPARING LITHOGRAPHIC PLATES FOR THE RECEPTION OF DESIGNS.

SPECIFICATION forming part of Letters Patent No. 773,904, dated November 1, 1904.

Application filed November 3, 1903. Serial No. 179,744. (No model.)

*To all whom it may concern:*

Be it known that I, HEINRICH LOUIS BENNO TOOBE, a subject of the King of Great Britain and Ireland, residing at Hornsea, in the county of York, England, have invented an Improved Method of Preparing Lithographic Plates for the Reception of Designs, of which the following is a specification.

This invention relates to a process for adapting plates of aluminium or zinc or a mixture of metals, such as aluminium and bronze or zinc, for lithographic printing in the same manner as lithographic stones.

The object of this invention is to prepare a metal plate with the herein-described solution for the reception of the design and to then so treat it that the design will be etched onto said prepared plate that printing may be done from it in the same manner as from lithographic stones.

In order to properly prepare the plate for the reception of the drawing and acid etcher or corrosive solution hereinafter described, a composition is prepared from calcium chlorid, a mixture of sulfuric clay, (potassium-aluminium sulfate,) zinc vitriol, (zinc sulfate,) hydrofluoric acid, and an acid mixture consisting of a solution of nitrous acid in nitric acid and sulfuric acid and distilled water. Suitable proportions for this mixture are one-half kilo calcium chlorid, one-half kilo potassium-aluminium sulfate, one-half kilo zinc sulfate, fifty grams hydrofluoric acid, and one kilo of the acid mixture consisting of a solution of nitrous acid in nitric acid with admixture of sulfuric acid in the proportion of 1.100, according to the result to be attained. This mixture as a whole is poured into a shallow vessel, and the plates are then subjected in this vessel for a short time to the action of this mixture. The plates are then rinsed in clean water and dried, and they are then ready for the reception of the drawing, reprint, transfer, steam-printing, &c. This bath brings to the surface of the metal a blackish mass containing impurities which are harmful to lithography and which are removed by the water wash, as well as serving to make the plate absorptive. After the drawing is on the plate the same is treated with the following caustic: phosphoric acid, chromic acid, tannic acid, gallic acid, sulfuric acid, and water, in about the following proportions: ten liters of water with thirty to two hundred and seventy grams of each acid, according to the fineness or coarseness of the drawing. This mixture is mixed with gum or not, according to the fineness of the nature of the work, then spread over the plate, and when dry the plate is washed with water and dried.

If drawings are to be prepared for printing editions of over one hundred thousand, they are subjected for a short time to the action of the herein-described solution by bathing the plate provided with the drawing.

If the plates after use are to be employed for another printing, they are, like the stone, washed out in known manner with oil of turpentine, then washed with a solution of one part of caustic potash in six parts of water, and then bathed in the solution hereinbefore described.

I claim as my invention—

1. The process for the preparation of metal plates for printing, said process consisting in subjecting plates of zinc, aluminium or suitable alloys to the action of an aqueous solution of calcium chlorid, a mixture of potassium-aluminium sulfate, a solution of nitrous acid in nitric acid with admixture of sulfuric acid, zinc sulfate, and hydrofluoric acid.

2. The process for the preparation of metal plates for printing, said process consisting in subjecting plates of zinc, aluminium or suitable alloys to the action of an aqueous solution of calcium chlorid, a mixture of potassium-aluminium sulfate, a solution of nitrous acid in nitric acid with admixture of sulfuric acid, zinc sulfate, and hydrofluoric acid, then placing the drawing onto the metal plates, which, after receiving the drawing, are overspread with the aqueous solution of a mixture of phosphoric acid, chromic acid, tannic acid, gallic acid, and sulfuric acid.

3. The herein-described process for preparing metal plates as substitutes for lithographic stones, consisting in first preparing the plate and applying the drawing, and then overspreading the plates with an aqueous mixture of phosphoric acid, chromic acid, tannic acid, gallic acid, and sulfuric acid, all substantially as described.

In testimony whereof I have signed my name to this specification in the presence of two subscribing witnesses.

HEINRICH LOUIS BENNO TOOBE.

Witnesses:
JEAN GRUND,
CARL GRUND.